(12) United States Patent
Kuivinen et al.

(10) Patent No.: US 9,940,309 B2
(45) Date of Patent: Apr. 10, 2018

(54) MEASURING WEB PAGE RENDERING TIME

(71) Applicant: Telefonaktiebolaget L M Ericsson (publ), Stockholm (SE)

(72) Inventors: Fredrik Kuivinen, Johanneshov (SE); David Lindegren, Luleå (SE)

(73) Assignee: TELEFONAKTIEBOLAGET L M ERICSSON (publ), Stockholm (SE)

( * ) Notice: Subject to any disclaimer, the term of this patent is extended or adjusted under 35 U.S.C. 154(b) by 211 days.

(21) Appl. No.: 14/431,251

(22) PCT Filed: Sep. 28, 2012

(86) PCT No.: PCT/EP2012/069203
§ 371 (c)(1),
(2) Date: Mar. 25, 2015

(87) PCT Pub. No.: WO2014/048489
PCT Pub. Date: Apr. 3, 2014

(65) Prior Publication Data
US 2015/0242379 A1  Aug. 27, 2015

(51) Int. Cl.
*G06F 17/00* (2006.01)
*G06F 17/22* (2006.01)
(Continued)

(52) U.S. Cl.
CPC .... *G06F 17/2247* (2013.01); *G06F 17/30899* (2013.01); *H04L 43/0852* (2013.01);
(Continued)

(58) Field of Classification Search
CPC ......... G06F 2201/875; G06F 17/30905; G06F 11/3419; G06F 17/30899
See application file for complete search history.

(56) References Cited

U.S. PATENT DOCUMENTS 6,006,260 A   12/1999  Barrick, Jr. et al.
6,625,647 B1   9/2003  Barrick, Jr. et al.
(Continued)

FOREIGN PATENT DOCUMENTS

CN   1320002 A   10/2001
CN   1582575 A   2/2005
(Continued)

OTHER PUBLICATIONS

Wikipedia Timestamp, Retrieved from ttps://en.wikipedia.org/wiki/Timestamp, Internet Archive Sep. 15, 2012, 2 pages.*
(Continued)

*Primary Examiner* — Scott Baderman
*Assistant Examiner* — Barbara Level
(74) *Attorney, Agent, or Firm* — Sage Patent Group

(57) ABSTRACT

A method in a network setup that includes a client entity and a network for handling a data flow to the client entity. The method estimates a screen rendering time of content at the client entity. The method includes the steps of observing the data flow to the client entity, estimating a screen area at the client entity based on the observed data flow, determining, from the data flow, content data associated with rendering content in the screen area, extracting at least data items from the determined content data, and estimating, as the screen rendering time, the time required to render the content in the screen area at the client entity based on the extracted data items.

20 Claims, 3 Drawing Sheets

(51) Int. Cl.
　　　*G06F 17/30* (2006.01)
　　　*H04L 29/06* (2006.01)
　　　*H04L 12/26* (2006.01)
　　　*H04L 29/08* (2006.01)

(52) U.S. Cl.
　　　CPC ............. *H04L 67/02* (2013.01); *H04L 67/42* (2013.01); *H04L 43/028* (2013.01); *H04L 43/04* (2013.01); *H04L 67/22* (2013.01)

(56) References Cited

U.S. PATENT DOCUMENTS

| | | | |
|---|---|---|---|
| 6,832,105 | B2 | 12/2004 | Okawa |
| 7,373,376 | B1 | 5/2008 | Hamer et al. |
| 7,486,254 | B2 | 2/2009 | Suzuki et al. |
| 7,933,988 | B2 | 4/2011 | Nasuto et al. |
| 2002/0116491 | A1* | 8/2002 | Boyd ............... G06F 11/3419 709/224 |
| 2002/0194434 | A1* | 12/2002 | Kurasugi .......... G06F 17/30902 711/137 |
| 2003/0221000 | A1 | 11/2003 | Cherkasova et al. |
| 2004/0073553 | A1* | 4/2004 | Brown .............. G06F 17/30958 |
| 2005/0015798 | A1 | 1/2005 | Yamamichi et al. |
| 2005/0262104 | A1 | 11/2005 | Robertson et al. |
| 2010/0153544 | A1 | 6/2010 | Krassner et al. |
| 2010/0268834 | A1 | 10/2010 | Eidelman et al. |
| 2011/0054878 | A1 | 3/2011 | Zhang et al. |
| 2012/0028643 | A1 | 2/2012 | Falchuk et al. |
| 2013/0124669 | A1* | 5/2013 | Anderson ........... G06F 11/3006 709/217 |
| 2013/0276009 | A1* | 10/2013 | Ajitomi .................. H04N 21/43 725/14 |
| 2013/0346597 | A1* | 12/2013 | Baumback .............. H04L 67/22 709/224 |

FOREIGN PATENT DOCUMENTS

| | | |
|---|---|---|
| CN | 1589569 A | 3/2005 |
| CN | 1893418 A | 1/2007 |

OTHER PUBLICATIONS

Wikipedia Cache (computing), Retrieved from ttps://en.wikipedia.org/wiki/Cache_(computing) Internet Archive Sep. 16, 2012, 5 pages.*
Prateek, S., Method and System for Managing Content in a Web Page during Slow Loading of Web pages and Offline Condition, IP.com Journal, Aug. 22, 2011.
Fredrik Kuivinen, Gunnar Heikkilä, EAB-11:068530 Uen, "Measuring Web Quality", A, Jun. 21, 2012.
The boomerang API, http://yahoo.github.com/boomerang/doc/api/index.html, 2015 Github, Inc.
Caroline Hägglund & Marcus Nyberg, A User Study of Mobile broadband on Smartphones, May 23, 2011.
Google, "Let's make the web faster", http://code.google.com/intl/sv-SE/speed/articles, Mar. 28, 2012.
International Search Report and Written Opinion of the International Searching Authority, PCT Application No. PCT/EP2012/069203, dated Jun. 3, 2013.
Fielding et al., "Hypertext Transfer Protocol—HTTP/1.1/", RFC 2616, Jun. 1999, retrieved Mar. 23, 2015 from http://www.rfc-editor.org/rfc/rfc2616.txt, 176 pp.
Fu et al., "EtE: Passive End-to-End Internet Service Performance Monitoring", ATEC '02, *Proceedings of the General Track of the annual conference on USENIX Annual Technical Conference*, Jun. 2002, pp. 115-130.
Hoβfeld et al., "The Memory Effect and Its Implications on Web QoE Modeling", *2011 IEEE 23rd International Teletraffic Congress (ITC)*, San Francisco, CA, Sep. 2011, pp. 103-110.
Ibarrola et al., "Web QoE Evaluation in Multi-agent Networks: Validation of ITU-T G.1030", *IEEE Fifth International Conference on Autonomic and Autonomous Systems (ICAS 09)*, Valencia, Spain, Apr. 2009, pp. 289-294.
Nielsen, "Scrolling and Attention", Mar. 22, 2010, retrieved Mar. 23, 2015 from http://www.nngroup.com/articles/scrolling-and-attention/, 6 pp.
Olshefski et al., "ksniffer: Determining the Remote Client Perceived Response Time from Live Packet Streams", *OSDI '04, Proceedings of the 6th conference on Symposium on Operating Systems Design and Implementation*, vol. 6, Dec. 2004, pp. 333-346.
Schatz et al., "Poor, Good Enough or Even Better? Bridging the Gap between Acceptability and QoE of Mobile Broadband Data Services", *2011 IEEE International Conference on Communications (ICC)*, Kyoto, JP, Jun. 2011, 6 pp.
Schatz et al., "T09-SG12-C-0236: Report on influence factors on web-browsing QoE and proposal of new study item", Nov. 2011, retrieved Mar. 23, 2015 from http://www.ftw.at/research-innovation/publications/standardization-contributions/2011/ftw-stand-2011-002, 1 p.
Ramachandran, "Web metrics: Size and number of resources—Make the Web Faster—Google Developers", May 26, 2010, downloaded Nov. 2, 2015 from https://web.archive.org/web/20140625155405/https://developers.google.com/speed/articles/web-metrics, 4 pp.
Office Action for Chinese Application No. 201280076100.1 dated Jun. 1, 2017 (8 pages).

* cited by examiner

MEASURING WEB PAGE RENDERING TIME

CROSS REFERENCE TO RELATED APPLICATION

This application is a 35 U.S.C. § 371 national stage application of PCT International Application No. PCT/EP2012/069203, filed on 28 Sep. 2012, the disclosure and content of which is incorporated by reference herein in its entirety. The above-referenced PCT International Application was published in the English language as International Publication No. WO 2014/048489 A1 on 3 Apr. 2014.

TECHNICAL FIELD

The present invention relates to measuring the rendering time of web pages. In particular, the present invention measures the time that is required for completing a first screen of a web page on a user's device or screen. The present invention specifically relates to a method for estimating a screen rendering time of content at a client entity, a related network entity, a related computer program as well as to a related computer program product.

BACKGROUND

Web browsing is a frequently used service on the internet and on other networks, such as internal intranet networks. Web browsing usually involves software (e.g. so-called browser) on a terminal device operated by a user, this user accessing and retrieving data from so-called servers to the terminal device by means of the browser software. The terminal device can be a personal computer (PC), lap- or palmtop computer, mobile phone, smartphone, tablet computer, personal digital assistant (PDA) or the like. This sort of device provides a user interface allowing the user to input commands and some sort of display. The display then shows the retrieved data to the user. In the following, the terminal device is referred to as a client entity in order to account for the great variety of devices that are used today.

The data retrieved from one or more servers is displayed on the client entity in response to corresponding instructions from the user via the browser software or other programs and applications on the client entity (pull). However, also the servers may instruct the client entity to retrieve and display data (push). In any way, the retrieved data is displayed, saved, executed, played back, etc. on the client entity. As far as displayable data is concerned, this data comprises text data, image data, video data etc. A corresponding text, image, or video is then displayed on a screen of the client entity. Other data, such as audio data, may involve further hardware on the client entity so as to—for example—play back/reproduce a sound, song, announcement, or a soundtrack related to a displayed video. All this data involved in web browsing may represent so-called content. This broader term is to be understood as to include all types of data that can be reproduced on the client entity in the context of web browsing. Thus, content includes text-, graphic-, image-, video-content, etc.

The user usually enters an address into the browser software, or effects any other corresponding selection, so as to browse a given, so-called web-page. Such a web-page comprises all sort of contents and can be usually larger than the screen of the client entity. Although the client entity will be able to display a miniaturized view of any web page, the usual procedure is to display a first screen of the page on the client entity and let the user subsequently decide what other parts or pages are to be displayed.

Service providers, network operators, web page owners and other involved bodies may require information on the quality of their services so as to be able to distribute and organize resources, initiate and implement improvements etc. Conventional methods for analyzing the so-called quality of experience (QoE) for web browsing implement some kind of QoE metric based on the technical page load time (PLT). The PLT is typically defined as the time it takes for a web browser to download/retrieve all content that belongs to a page. It is already common practice that web site administrators can optimize the PLT by reorganizing the content on their sites.

Conventional methods for measuring the PLT include analyzing web server logs, to sending custom Javascript code to the browser that makes the measurements and then sends the result back to the server, and intercepting network traffic and reconstructing the page structure. Some of these, however, suffer from the drawback that the web server administrator must be involved in the measurement process. It is not possible for a network operator to measure web metrics on a large scale using these approaches.

Specifically, the technical PLT can be measured with executable code that is sent to the client. After doing the measurement the code reports the measurement back to a measurement server. It was also proposed that active measurement nodes can be used to do measurements and hence no code needs to be sent to ordinary client browsers. Further, the performance of a sequence of network requests can be measured that could be requests for web pages. The goal is to measure the time it takes to perform such a sequence of requests for a client and the focus is on evaluate the performance of a specific site. The approach is to record a sequence of requests and then send the recording to "data acquisition agents" spread over the network which will replay the recording. Measurements of the sequence of requests are then obtained from a variety of network parameters from different parts of the globe. The end to end performance can then be evaluated for the sequence of requests for the data acquisition agents. Also, passively measuring end-to-end technical PLT and other technical measurements such as caching efficiency are possible. Yet further, the performance of a network server can be determined by recording client requests at a server and then replaying these requests locally on the server to measure the performance of the server.

However, an interesting aspect that web users spend most of their time for looking at the first screen of a web page. Numbers suggest that users may take up to 80% of their time at looking at the first screen which usually provides an overview of the entire web page and/or provides means for navigating to other (not yet shown) parts of the web page. In this sense, the first screen can be an appropriate means to convey the most important contents or an overview of the contents as a whole to the user.

However, the above-mentioned PLT may differ significantly from the time to render the first screen. In particular, the technical PLT is in some cases more than twice the time to render the first screen. In general, the longer the page is, the longer will be the technical PLT, whereas the time it takes to render the first screen is not necessarily dependent on how much additional contents and pages form part of a web page/site.

The conventional approaches do not measure time to render the first screen. Rather, they are focused on measuring the technical PLT and do therefore not take into account the perception of the user, which is—however—a significant figure for estimating the QoE of web browsing. It is, moreover, difficult to adapt existing solutions so as to measure the time to render the first screen due to a lack of scalability. Further problems arise when user terminals are involved, e.g. by inserting Javascript code when the traffic goes through the network, since the resulting modifications and involvement of user hardware and communication resources are usually inacceptable.

As a consequence, there is a need for a way of measuring a web page rendering time that takes into account the amount of contents the user sees first. This way should be efficient, easy to implement and scalable. Involvement of network and web site administrators should be reduced to a minimum.

SUMMARY OF THE INVENTION

The above objects and mentioned problems are solved by the subject-matter of the independent claims. Preferred embodiments are described in the dependent claims.

According to an embodiment of the present invention, there is provided a method in a network setup, the network setup comprising a client entity and a network for handling a data flow to the client entity, for estimating a screen rendering time of content at the client entity, the method including the steps of observing the data flow to the client entity, estimating a screen area at the client entity based on the observed data flow, determining, from the data flow, content data associated with rendering content in the screen area; extracting at least data items from the determined content data, and estimating, as the screen rendering time, the time required to render the content in the screen area at the client entity based on the extracted data items.

According to another embodiment of the present invention, there is provided a network entity having a processing unit for estimating a screen rendering time of content at a client entity of a network setup, the network setup comprising the client entity and a network for handling a data flow to the client entity, the processing unit being configured to observe the data flow to the client entity, estimate a screen area at the client entity based on the observed data flow, determine, from the data flow, content data associated with rendering content in the screen area, extract at least data items from the determined content data; and to estimate, as the screen rendering time, the time required to render the content in the screen area at the client entity based on the extracted data items.

According to further embodiments, a computer program comprising code, when executed on a processing unit, to perform the steps of the method embodiments of the present invention, and a related computer program product are provided.

BRIEF DESCRIPTION OF THE DRAWINGS

Embodiments of the present invention, which are presented for better understanding the inventive concepts but which are not be seen as limiting the invention, will now be described with reference to the Figures in which.

DETAILED DESCRIPTION

Figure 1:
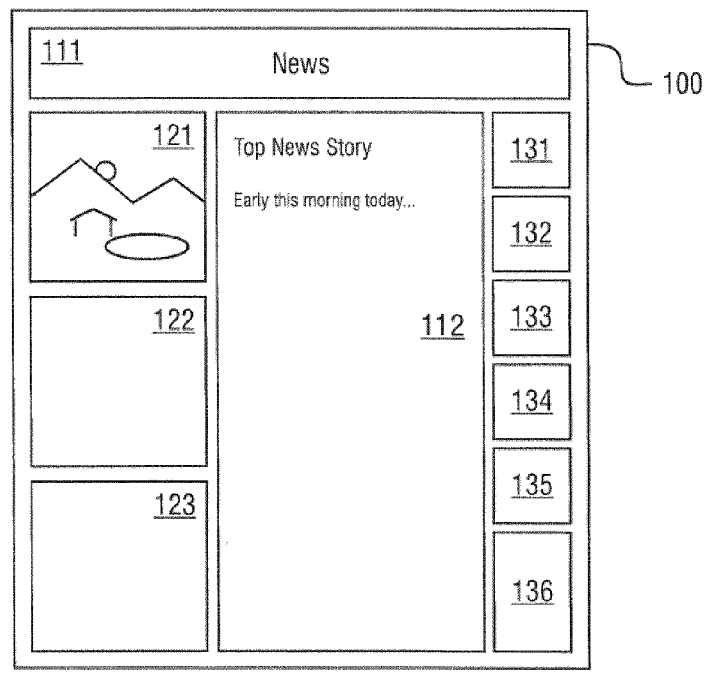
FIG. 1 shows a schematic representation of a web page.

FIG. 1 shows a schematic representation of a web page 100. The web page 100 comprises various content, such as text elements 111, 112, graphic and image elements 121, 122, 123 and other elements 131 to 136. One of the latter or also one of the graphic and image elements 121, 122, 123 may also be a video element or an animated graphic element. Such elements may include navigational aids for controlling the play back of the video. The latter may also involve play back of audio. Audio as such is normally reproduced by other hardware of the client entity but can be represented graphically or influence graphics with regard to amplitude and frequency of the current audio (sound related effects, bar graphs, spectrum analyzers etc.).

The shown elements 111 to 136 can only be displayed if corresponding data is present (cached) on the client entity or retrieved thereto from one or more servers. The data involved may be one data object for one element (e.g. an image file "sunset.jpg" displayed then as element 121), more than one data object for one element, or even one data object for more than one element. Thus, in the context of the present invention, it is referred to content data that is associated with rendering content in a screen area, i.e. any data that is involved in displaying elements/objects of the web page in a given screen area. In general, the web page 100 typically consists of many different elements/objects of different types such as HTML, Javascript, images, CSS, audio, and video. An established approximate figure for an average number of different or distinguishable elements and objects is in the order of 40.

Figure 2A:
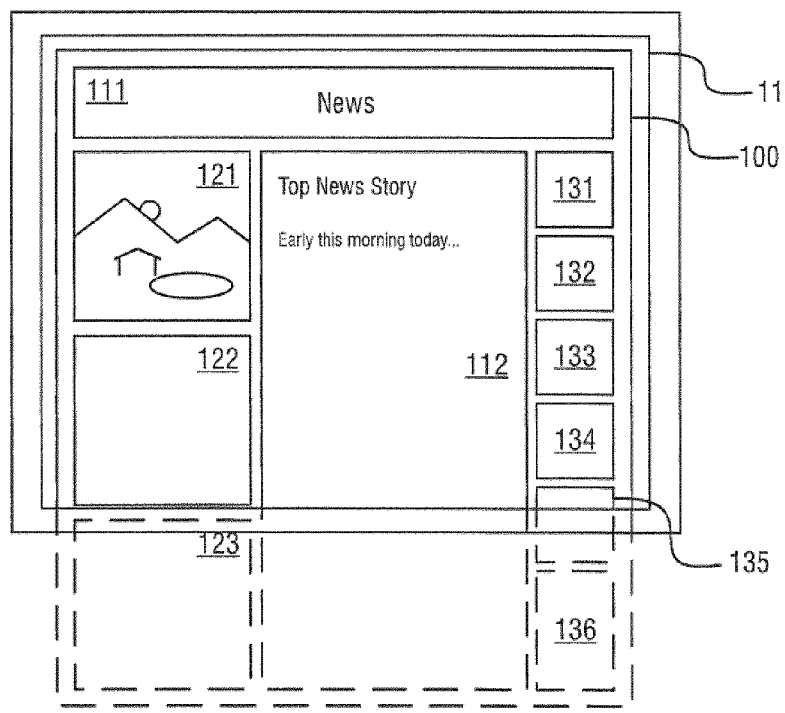
FIGS. 2A and 2B show schematic representations of displaying parts and contents of a web page on a client entity according to embodiments of the present invention.

FIG. 2A shows a schematic representation of displaying elements and contents of a web page on a client entity. As an example, a screen 11 of a client entity shows a part of the web page 100 as described in conjunction with FIG. 1. As can be seen, the screen 100 provides a screen area that accommodates the text element 111 and the elements 121, 122, and 131 to 134. However, the web page 100 exceeds in the current view size the screen area so that elements 123 and 135 can only be displayed in part and elements 123 and 136 cannot be displayed at all.

In the shown case (FIG. 2A), the first screen would correspond to the screen area of screen 100. Thus, for rendering the first screen, at least the content data that is associated with displaying elements 111, 121, 122, and 131 to 134 need to be present on the client entity or need to be retrieved/downloaded thereto. As far as elements 112 and 135 are concerned, it can be assumed that also their respective content data must be present/downloaded although they are only displayed in part.

Figure 2B:
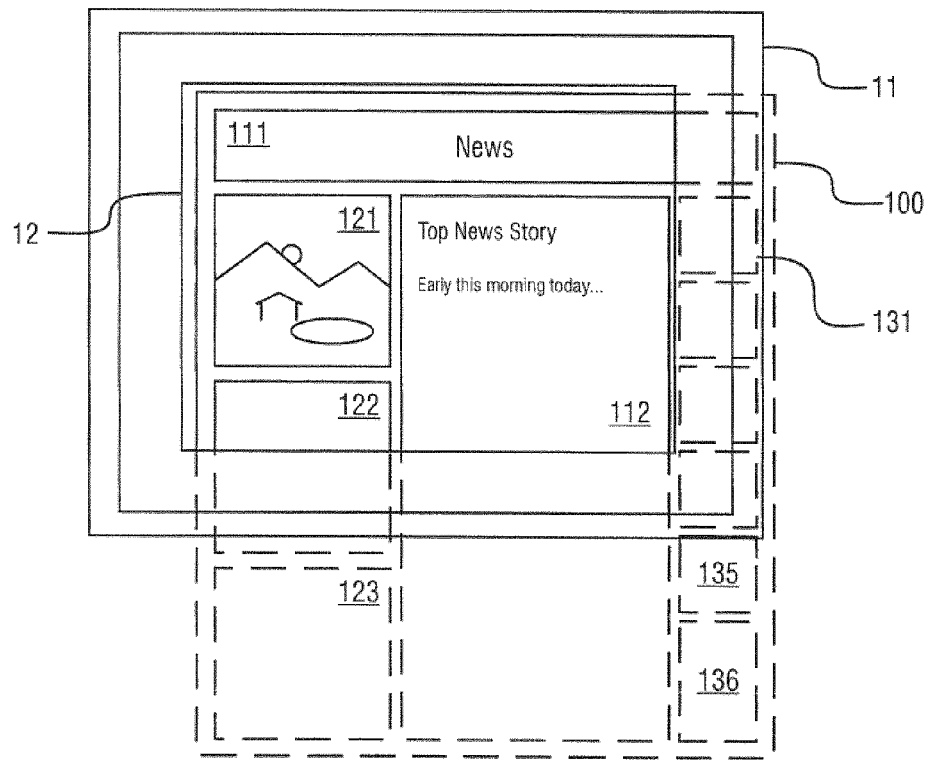

FIG. 2B shows another schematic representation of displaying parts and contents of a web page on a client entity. As a further example, parts of the web page are displayed in a window 12 on the screen 11 of the client entity. The web page is again assumed the one being described in conjunction with FIG. 1. As can be seen, the screen 100 provides a screen area only of the size (or corresponding to) of the window 12 being likely smaller than the area of the screen 11 (at maximum it will be the intersection of the area of screen 11 and the area of the window 12).

As a consequence, the available screen area only accommodates parts of the text parts 111, 112, parts of element 122 and the entire element 121. All the remaining elements cannot be displayed at all.

Figure 3:
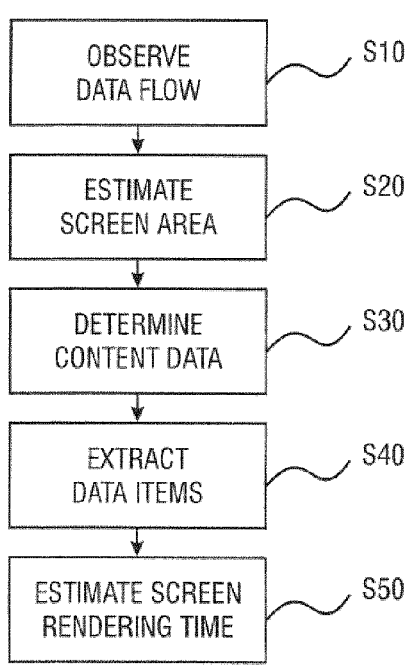
FIG. 3 shows a flowchart of a method embodiment of the present invention.

FIG. 3 shows a flowchart of a method embodiment of the present invention. The method can be performed in a network setup that comprises a client entity and a network for handling a data flow to the client entity. The method is for estimating a screen rendering time of content at the client entity. With reference to the above described embodiments, the method would estimate the time that is required for rendering all the elements of the web page 100 that fit onto the screen size of screen 11 or window 12.

For this purpose, the method includes the step S10 of observing the data flow to the client entity, the step S20 of estimating a screen area at the client entity based on the observed data flow (e.g. the area of screen 11 or of the window 12), a step 930 of determining, from the data flow, content data associated with rendering content in the screen area, a step 940 of extracting at least data items from the determined content data, and a step S50 of estimating, as the screen rendering time, the time required to render the content in the screen area at the client entity based on the extracted data items. For example, the determined content data comprises image data in form of e.g. a .jpg-file. An individual data item can then be for example the width information from that .jpg-file, said information usually represented as at least one byte. If the height information is represented be one byte too, these two bytes are extracted in the sense of two data items. However, a data item may well be a more complex data structure such as a file preamble or header.

An embodiment of the invention can thus be implemented by passively listen to the HTTP traffic going through a network in the sense of observing the data flow to a client entity. Relevant parts of this traffic can be extracted, for example, by deep packet inspection (DPI) for further analysis. These relevant parts are at least data items from content data that has been determined from the observed data flow as being associated with rendering content in the screen area. For the example that an image file is scheduled to be displayed on the screen a relevant part (data item) can be the image size in terms of file size, image data size, and/or image dimensions (i.e. width and height). In this way, the extracted data items may suffice to estimate the screen rendering time since the actual image data is not required to be extracted.

In the analysis the size of the screen, i.e. the so-called screen area, will be a parameter that embodiments of the present invention may need to refer to. Specifically, this screen area can be estimated from the observed data flow. Although it is usually not possible to determine the size of the screen the client is using from the network traffic as obtained with a passive DPI probe, examining the user-agent HTTP header provides such a possibility to determine which browser, hardware platform, and operating system is used by the client entity. From this information an estimate can be made about the screen size, and, in turn, the screen area can be estimated. For example, if a certain type of tablet PC or a smartphone of a known brand and model is used, the screen size is known.

For PCs (laptop and desktop) further steps may need to be considered to estimate the screen size or area. For such devices the browser window could also be smaller than the screen and hence the effective screen size useable by the browser may be less than the size of the actual screen (cf. references 11, 12, and 100 in FIGS. 2A and 2B). In such cases, some heuristics can be employed, including estimation schemes that are based on a version of the used OS and/or browser (obtained from the HTTP user-agent header). The OS and browser version will give an indication on how old the device (client entity) is, which, in turn, makes it possible to give an estimate of the screen size and area. Further, there are also other factors which can influence how large part of the page is visible on the first screen. For example, a user could have configured his/her browser to use a larger font size than the default. This will make a smaller part of the page visible on the first screen compared to the default. However, it can be assumed that such customizations are rare and the default will be a good fit for most page loads.

Further analysis for estimating the screen rendering time can be effected by an analysis "module" comprising code/software that on a superficial level behaves as a web browser. By feeding the captured traffic (extracted data items) into the web browser like software the time to render first screen can be estimated. To deal with cached objects a database can be connected to the analysis module. In such a database information that may be needed to layout a page is stored. This includes sizes (in pixels) of cacheable images and videos and the contents of cacheable HTML, CSS, and Javascript. Only information about cacheable objects needs to be stored in the database. This information is used when a browser retrieves a page and does not request some of the objects on the page from the server because they already exist in the cache of the browser.

In current web browsers and servers the web objects are transported over HTTP which runs on top of TCP. However, in HTTP there is no concept of a "page". Hence, when looking at the traffic from within the network all that can be observed are many different TOP connections transporting many different objects and elements. It may thus be required to group the web objects into a page structure.

In HTTP the "resources" (objects, elements) are requested by the client browser and responses are sent by the server. As already said, an object can be of many different types (e.g. HTML, CSS, Javascript, images, videos, fonts, etc.). A web page typically consists of many objects spread over several distinct servers. It is the job of the browser to contact the servers and request all the objects that are required to display the page. As a page typically does not reside on one server these objects are transported over multiple TCP sessions.

On a high level a three step procedure can be used to interpret the traffic as a page structure. First, the TCP sessions are transformed into bi-directional continuous streams of bytes. Second, the HTTP objects are extracted from the streams of bytes, and, third, the objects are grouped into pages. Techniques for performing the latter include the examining of the HTTP referrer header to derive relationships between the objects, taking the timing of requests into account to avoid mixing objects that belong to one page with objects that belong to another page that the user navigated to at a later point in time, and storing historical data on what objects were retrieved for a certain page. For the latter option an example would be statistics relating a request to example.com to a given likelihood that also example.com/a.jpg is requested.

As far as the requesting of a server is concerned, it is to be noted that prior to the request the browser usually needs to get the IP address of the server. Unless the browser has been in contact with the server earlier and has cached the IP address a domain name server (DNS) lookup needs to be done. Preferably, the time for this DNS lookup can also be included in estimating the screen rendering time. However, subsequent DNS lookups that may need to be performed to get IP addresses of other servers that host content that belong to the page, do not contribute to the rendering time. Hence they can be disregarded. Related aspects also include the fact that browsers may also perform DNS lookups speculatively: For example, a browser could issue a DNS lookup for example.org as soon as a the users visits a page with a link pointing to example.org, but long before the user has actually clicked on a link to example.org. Furthermore, the time spent on DNS lookups is typically small compared to the time it takes to download the content needed to render the first page.

For each object that belongs to the page a timestamp can then be stored when the object was completely received by the client entity. In some protocols the time when a certain object was displayed may be communicated from the client to the server. If such a protocol is used, then the communicated timestamp can be stored instead. Such a protocol would enable an even more accurate estimation of the time to render the first screen. To accurately measure the rendering time objects of some types need to be stored in their entirety whereas only parts of other object types need to be stored. Specifically, there can be a tradeoff between accuracy of the rendering time estimate and computational complexity.

An embodiment for attaining high accuracy of the estimated screen rendering time can be summarized as follows: The contents of all HTML, CSS, and Javascript objects are sent completely from the DPI module to the analysis module. For video and images only some metadata (data items) need to be sent such as the size in pixels and the size in bytes. The visual content of the object may not be needed to measure the render time hence it can be omitted to increase the performance of the system. Depending on how the image and video objects are used in the HTML it may not even be necessary to send the resolution of the images and videos. In particular, if the WIDTH and HEIGHT attributes are used for all the IMG tags referencing the image then the values of these attributes specify the size in which the image will be rendered.

When all relevant objects that belong to the page have been sent to the analysis module they are fed into the browser like software. The browser like software examines the content (HTML, CSS, Javascript, and image and video sizes) and layout the content as a browser would. Note that the Javascript code is executed within the browser like software and any changes made to the page by such client side code may contribute to the rendering time. The time to render first screen is then estimated as the maximum timestamp associated with an object that appears on the first screen of the layout.

On the other hand, an embodiment for attaining low computational requirements can be summarized as follows: Namely, if very efficient processing is desired and a less accurate estimate of the time to render first screen is acceptable, then the following variant can be used. As above, all HTML and CSS objects are sent from the DPI module to the analysis module, but Javascript objects are not sent. Only the sizes of the images and videos on the page are sent. When all relevant objects have been sent a browser like software makes a layout of the page. Note that in this case any client side code is ignored and is thus not executed hence a much more efficient processing is possible. As in the previous variant the time to render first screen is estimated as the maximum timestamp associated with an object that appears on the first screen of the layout.

Some objects on a page may be cached by the browser in the client entity. The caching in HTTP can be divided into two different types, wherein in the first type the browser does not issue any request to the server before it makes use of a cached object (which objects can be cached in this way is controlled by the HTTP headers Cache-Control and Expires sent by the server). In the second type, the browser issues a request to the server to ask if the copy the browser has of a certain object is up to date (this type of cache is controlled by the HTTP headers Cache-Control, If-Modified-Since, and If-None-Match sent by the client and Cache-Control, Etags, and Last-Modified sent by the server).

If an object which belongs to the page (e.g., an image referenced in the HTML by an IMG tag) is not seen by the DPI probe, then it can be assumed that the browser already has an up to date copy of the object in its cache. In this case the object does not substantially contribute to the rendering time independent from whether it is contained in the first page or not. This part takes care of the first type of caching. However, note that such an object could still affect the render time as, e.g., a large cached image on the first screen will push other content down, maybe to the second or subsequent screens. Similarly, a cached HTML or CSS can impact the layout of the page.

In the second type of caching the DPI may see a request for the object, but no content is sent from the server as the browser's copy is still up to date. In this case the timestamp of the response can be used as the timestamp of the object. When either type of caching is used for images or videos the resolution of these objects will not be available in the network traffic. As the resolution is sometimes needed to layout the page this will be taken into account when the rendering time is estimated. However, as the object was cached by the browser the browser must have downloaded this object at some earlier point in time. Therefore, the resolutions (dimensions) of any images and videos can be stored in a database when they are seen by the DPI. Note that this database only needs to store the URL and resolution (two integers) for each image and video.

A timestamp, indicating when the object was last used, could also be stored with each record to enable pruning of entries that have not been used for some time (e.g., a least recently used policy could be used). Alternatively, a timestamp, if provided by the server, that indicates how long the cached object is valid can be stored in the database and used for pruning.

Furthermore, only images and videos which are cacheable (as indicated by the Cache-Control header sent by the server) needs to be stored. For other types of objects, whose content may have an impact of the layout of the page (such as HTML, CSS, and Javascript), the content of the objects may need to be stored in the data base. As above only objects that are cacheable as indicated by the Cache-Control header sent by the server needs to be stored in the database.

The storage requirements on the database connected to the DPI may be significantly less than the storage requirements on an ordinary caching web proxy (assuming a decent hit rate in the proxy). The database proposed only needs to store the actual content of some content-types whereas a caching proxy usually stores the content of all content-types it caches. In particular, images make up a large part of all cacheable content.

According to one estimate about 33% of all HTTP traffic is cacheable (measured in downlink bytes). Of these 33% about 27% are content-types that have impact on the layout of the page (we have considered text/html, application/x-javascript, text/css, text/javascript, application/javascript, and text/xml to have impact on the layout). If Javascript is disregarded the percentage drops to 13% (which would be the relevant metric for respective embodiments). Hence, in total 9% (or 4%) of the HTTP traffic needs to be considered for storage in the database. Of course only one copy of each object needs to be stored and as these objects are cacheable they typically appear in the traffic multiple times. The actual storage needed in the database will thus be significantly less than 9% (or 4%) of the HTTP traffic. The storage requirements can be reduced further by using compression. A possible distribution of cacheable content for the content-types that occupies the biggest part of the downlink traffic is given in the following table.

| Content-type header | Percent of cacheable content |
|---|---|
| image/jpeg | 41.2% |
| image/png | 11.7% |
| text/html | 9.4% |
| image/gif | 7.7% |
| Empty content-type header | 4.6% |
| application/x-javascript | 3.5% |
| application/octet-stream | 3.3% |
| text/css | 2.5% |
| text/javascript | 2.5% |
| application/javascript | 2.4% |
| application/x-shockwave-flash | 2.3% |
| text/xml | 1.4% |
| video/mp4 | 1.1% |
| text/plain | 1.1% |
| application/vnd.google.safebrowsing-chunk | 0.9% |
| Sum | 95.6% |

Figure 4:
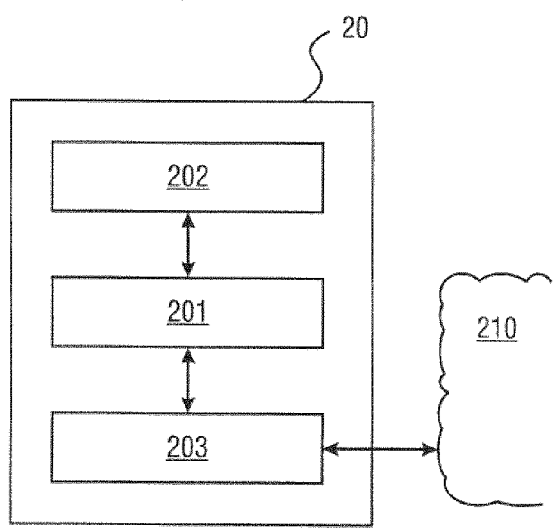
FIG. 4 shows a schematic representation of a network entity according to an embodiment of the present invention.

FIG. 4 shows a schematic representation of a network entity according to an embodiment of the present invention. The network entity comprises a processing unit 202 that can exchange data with a memory unit 202 and a network unit 203. The latter provides communication and data exchange to the network 210.

The memory unit 202 may store code that instructs the processing unit 201 to perform any of the method embodiments of the present invention. Specifically, the memory unit 202 may store code that instructs the processing unit 201 to observe the data flow to the client entity, estimate a screen area at the client entity based on the observed data flow, determine, from the data flow, content data associated with rendering content in the screen area, extract at least data items from the determined content data, and to estimate, as the screen rendering time, the time required to render the content in the screen area at the client entity based on the extracted data items. This code may be adapted to implement any of the above method and conceptual aspects as described in conjunction with the embodiments of the present invention.

Figure 5A:
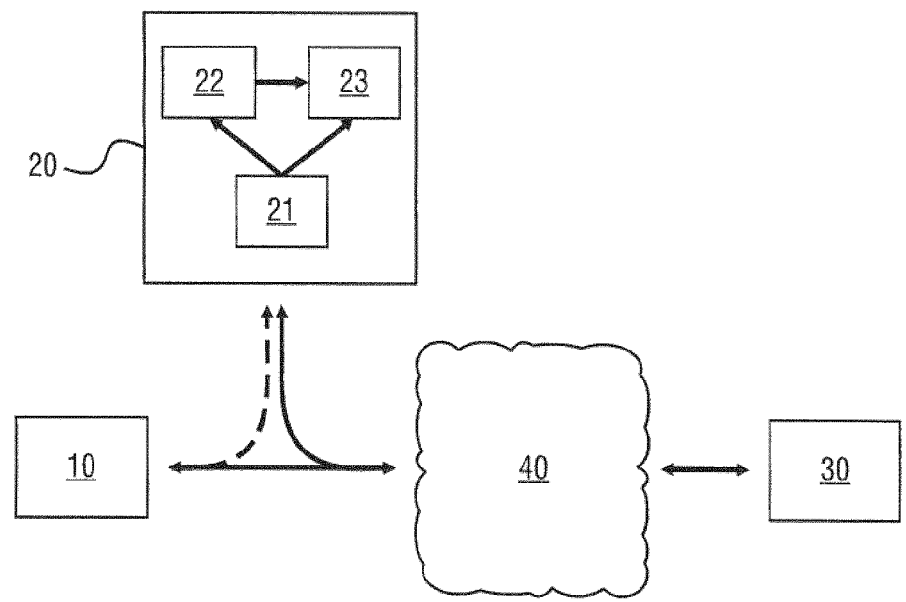
FIGS. 5A and 5B show schematic representations of implementations of embodiments of the present invention.

According to further embodiments of the variants described above, including those with a different emphasis on accuracy and/or processing resources, can be deployed, in turn, in two different ways. Specifically, FIG. 5A shows a schematic representation of one of such implementations in which the probe is deployed "close" to a client entity 10. Typically, embodiments of the present invention are implemented by a network operator there, who can monitor the time to render first screen for all users that have a subscription with the operator when they visit any web site. Specifically, the probe (e.g. the network entity 20 configured to perform a method embodiment of the present invention) is employed "between" the client entity 10 and a network 40 (e.g. internet) that conveys data flows from and to the entity 10 to one or more servers 30.

In FIG. 5A the client entity 10 is connected to the server 30 through Internet 40. Entity 20 comprises in this example the parts that implement the functionality according to this invention. One possible deployment option is depicted where a DPI probe 21, a database 22, and a web page analysis module 23 are "close" to the clients and are implemented in the entity 20. However, parts 21, 22, and 23 may well be implemented in a distributed manner across two or more entities. According to the embodiments described in conjunction with FIG. 5A, however, the data flow is probed by means of the DPI probe 21 between the client entity 10 and the network 40.

The entity 20 could, for example, be owned or operated by a network operator to monitor the performance of its users. The DPI module 21 taps of traffic (data flow) from the network 40 and filters it to get the relevant content data and data items (HTTP traffic of the content-types of interest). The DPI module 21 may also group the HTTP objects into web pages. Cacheable objects of relevant content-types (text/css, text/html, application/javascript) are sent to the database 22 and sizes of images and video objects are also sent to the database 22. The web pages are then sent to the web page analyzer 23 for render time estimation. The web page analyzer 23 estimates the page rendering time by using the objects it gets from the DPI module 22. Objects that were cached in the browser, and hence were not sent over the network, are fetched from the database 22.

Figure 5B:
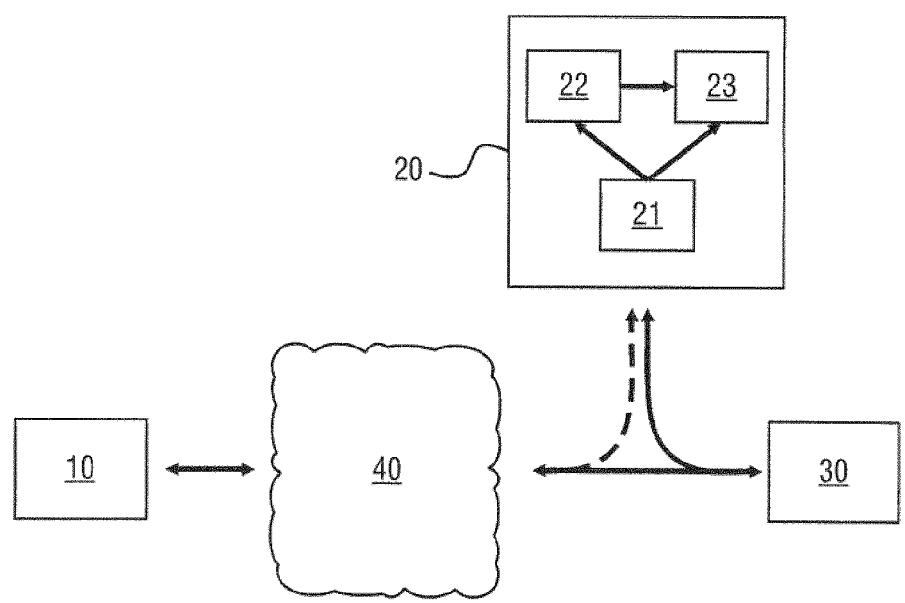

Likewise, FIG. 5B depicts another possible deployment option where the DPI probe 21, the database 22, and the web page analysis module 23 are "close" to the server 30. In this case a server owner can monitor the performance of the users that visits his/her site. Specifically, the web site owner can in this case monitor the performance of the site for all users that visit the site without making any changes to the web application that runs on the server 30

According to the various embodiments of the present invention several advantages can be obtained. Amongst other, the deficiency of conventional solutions not being able to measure a perceived PLT but instead focusing on the technical PLT can be removed. For the quality of experience of the user the perceived PLT may be of much higher relevance than the technical PLT. As the technical and perceived PLTs can differ significantly, the present invention may provide a much better metric for the quality of experience for the user on the basis of the estimated screen rendering time.

At the same time, emphasis can be made on different objects, such as accuracy or processing resources, so that some embodiments provide the advantage that the estimation of the time to render first screen is very accurate, whilst other embodiments provide the advantage that the processing requirements remain moderate. Compared to approaches that inject Javascript, the advantages are that the present invention is completely passive. No Javascript code need to be injected into the browsers and no cooperation needs to be established with browser vendors or server operators. These properties makes it much easier to deploy (compared to injection of Javascript by server as no changes are required on the servers) and more robust. Specifically, Javascript can break in many ways, especially if inserted by a proxy which is not owned by the web sited administrator.

Regardless of the deployment situation, i.e. either between entity 10 and the network 40 or the network 40 and the server 30, the parts 21, 22, and 23 of entity 20 may be implemented by means of the sections 201, 202, and 203 as described in conjunction with FIG. 4. Specifically, the DPI 21 and the analyzer 23 can be implemented by code being stored in the memory unit 201 that is executed by the processing unit 201. Especially the DPI 21 may rely upon the communication unit 203 so as to tap off data traffic from the communications provided by network 40. The memory unit 202 may also be arranged so as to host the data base 22. However, additional memory storage means, internal or external to the entity 20, may be provided for this purpose.

Although detailed embodiments have been described, these only serve to provide a better understanding of the invention defined by the independent claims, and are not to be seen as limiting.

The invention claimed is:

1. A method performed in a network setup, the network setup comprising a client entity and a network for handling a data flow to the client entity, for estimating a screen rendering time of content at the client entity, the method performed by at least one processor of at least one entity in the network, the method including the steps of:
    observing the data flow to the client entity;
    estimating a screen area at the client entity based on the observed data flow, wherein estimating the screen area includes examining a user agent http header from the data flow to estimate a screen size from information in the user agent http header and estimating the screen area based on the estimate of the screen size, the information in the user agent http header comprising at least one of: browser information, hardware platform information, and/or operating system information;
    determining from the data flow, content data associated with rendering a first screen of content in the screen area, wherein the content comprises more than one screen of content;
    extracting at least data items from the determined content data associated with rendering the first screen of content;
    estimating as the screen rendering time, the time required to render the first screen of content in the screen area at the client entity based on the extracted data items;
    controlling rendering of content provided by a site responsive to the estimate of the screen rendering time; and
    providing the estimated screen rendering time, via the network, to a recipient associated with the site to enable the recipient to monitor performance of the site based on the estimated screen rendering time.

2. The method of claim 1, wherein the screen rendering time indicates a time period from sending from the client entity a request for rendering content to completing the rendering of the first screen of content in the screen area.

3. The method of claim 1, wherein the determining of content data and/or the extracting of data items includes deep packet inspection (DPI).

4. The method of claim 3, wherein the deep packet inspection is performed on at least one of html-, css-, image-, audio-, video-, and javascript-objects as part of the data flow.

5. The method of claim 4, wherein estimating the screen rendering time includes considering a timestamp for objects when completely received by the client entity.

6. The method of claim 5, wherein the screen rendering time is estimated based on a maximum time stamp of objects that are rendered as the first screen of content in the screen area.

7. The method of claim 1, wherein the screen rendering time is estimated based on a time when the first screen of content data was displayed in the screen area, said time being communicated from the client entity.

8. The method of claim 1, wherein the data items include any one of object metadata, object attribute data, pixel size data, byte size data, length data, duration data, and play time data.

9. The method of claim 1, wherein determining of content data includes grouping of objects associated with one page.

10. The method of claim 9, wherein the grouping includes transforming TCP sessions for transmitting the objects into a data stream and extracting http, https, or spdy objects from the data streams.

11. The method of claim 9, wherein the grouping includes examining http referrer headers to derive relationships between objects.

12. The method of claim 9, wherein the grouping includes considering request timings for receiving objects.

13. The method of claim 9, wherein the grouping includes storing of and referring to historical data of requested objects.

14. The method of claim 1, wherein estimating the screen area further includes determining a type of hardware platform based on an operating system version and/or a browser version at the client entity determined from the data flow.

15. The method of claim 1, wherein the method further comprises storing at least portions of cached objects in a database.

16. The method of claim 1, wherein the method is performed between the client entity and the network.

17. The method of claim 1, wherein the method is performed between the network and a server entity for providing at least a part of the data flow to the client entity.

18. A network entity having a processor for estimating a screen rendering time of content at a client entity of a network setup, the network setup comprising the client entity and a network for handling a data flow to the client entity, the processor being configured to:
    observe the data flow to the client entity;
    estimate a screen area at the client entity based on the observed data flow, wherein estimating the screen area includes examining a user agent http header from the data flow to estimate a screen size from information in the user agent http header and estimating the screen area based on the estimate of the screen size, the information in the user agent http header comprising at least one of: browser information, hardware platform information, and/or operating system information;
    determine, from the data flow, content data associated with rendering a first screen of content in the screen area, wherein the content comprises more than one screen of content;
    extract at least data items from the determined content data associated with rendering the first screen of content;
    estimate, as the screen rendering time, the time required to render the first screen of content in the screen area at the client entity based on the extracted data items;
    controlling rendering of content provided by a site responsive to the estimate of the screen rendering time; and
    providing the estimated screen rendering time, via the network, to a recipient associated with the site to enable the recipient to monitor performance of the site based on the estimated screen rendering time.

19. The network entity of claim 18 wherein the screen rendering time indicates a time period from sending from the client entity a request for rendering content to completing the rendering of the first screen of content in the screen area.

20. A computer program product comprising a non-transitory computer readable medium storing program code that when executed on a processor performs the steps of:
- observing the data flow to the client entity;
- estimating a screen area at the client entity based on the observed data flow, wherein estimating the screen area includes examining a user agent http header from the data flow to estimate a screen size from information in the user agent http header and estimating the screen area based on the estimate of the screen size, the information in the user agent http header comprising at least one of: browser information, hardware platform information, and/or operating system information;
- determining from the data flow, content data associated with rendering a first screen of content in the screen area, wherein the content comprises more than one screen of content;
- extracting at least data items from the determined content data associated with rendering the first screen of content;
- estimating as the screen rendering time, the time required to render the first screen of content in the screen area at the client entity based on the extracted data items;
- controlling rendering of content provided by a site responsive to the estimate of the screen rendering time; and
- providing the estimated screen rendering time, via the network, to a recipient associated with the site to enable the recipient to monitor performance of the site based on the estimated screen rendering time.

* * * * *